(12) United States Patent
Box et al.

(10) Patent No.: US 8,667,068 B2
(45) Date of Patent: Mar. 4, 2014

(54) METHOD AND APPARATUS FOR ELECTRONIC MESSAGE DELIVERY

(75) Inventors: Thomas C. Box, Westlake Vlg, CA (US); Ana Belen Benitez, Los Angeles, CA (US)

(73) Assignee: Thomson Licensing, Boulogne (FR)

( * ) Notice: Subject to any disclaimer, the term of this patent is extended or adjusted under 35 U.S.C. 154(b) by 1024 days.

(21) Appl. No.: 11/990,198

(22) PCT Filed: Aug. 15, 2006

(86) PCT No.: PCT/US2006/031881
§ 371 (c)(1),
(2), (4) Date: Feb. 7, 2008

(87) PCT Pub. No.: WO2007/022205
PCT Pub. Date: Feb. 22, 2007

(65) Prior Publication Data
US 2009/0292774 A1 Nov. 26, 2009

Related U.S. Application Data

(60) Provisional application No. 60/708,623, filed on Aug. 16, 2005.

(51) Int. Cl.
*G06F 15/16* (2006.01)

(52) U.S. Cl.
USPC .......................................................... 709/206

(58) Field of Classification Search
USPC .............. 709/201–207, 217–231; 725/32–36, 725/143–153
See application file for complete search history.

(56) References Cited

U.S. PATENT DOCUMENTS 6,064,420 A 5/2000 Harrison et al.
6,141,693 A * 10/2000 Perlman et al. ............... 709/236
(Continued)

FOREIGN PATENT DOCUMENTS

EP 1089560 A1 * 4/2001
JP 2003-143577 5/2003
(Continued)

OTHER PUBLICATIONS

Bove VM, et al: "Hyperlinked Television Research at the MIT Media Laboratory" IBM Systems Journal, IBM Corp. Armonk, New York, US, vol. 39, No. 3/4, 2000, pp. 470-478, XP000981847, ISSN: 0018-8670, p. 476, Col. 21-p. 447, Col. 1, 2000.

(Continued)

*Primary Examiner* — Joshua Joo
(74) *Attorney, Agent, or Firm* — Robert D. Shedd; Vincent E. Duffy; Michael A. Pugel (57) ABSTRACT

Timely delivery of electronic messages during a presentation is a valuable tool. The embodiments describe a method and apparatus for delivering electronic messages. One method includes creating the electronic message by identifying auxiliary media content associated with a main presentation and marking temporal locations within the main presentation to allow delivery of electronic messages based on auxiliary media content. Another method includes receiving a package containing first and second content, separating the first content from the second content, providing the first content on a first medium, and providing an electronic message based on the second content on a second medium. Finally, a composition playlist includes a main presentation file and an auxiliary content file containing temporal links associated with the main presentation with the auxiliary content file to be delivered as an electronic message at a predetermined time based on the temporal links during presentation of the main presentation file.

18 Claims, 5 Drawing Sheets

(56) References Cited

U.S. PATENT DOCUMENTS

| | | |
|---|---|---|
| 6,711,379 B1 * | 3/2004 | Owa et al. .................... 455/3.01 |
| 7,020,888 B2 * | 3/2006 | Reynolds et al. ............... 725/34 |
| 2002/0101537 A1 | 8/2002 | Basson et al. |
| 2002/0188958 A1 * | 12/2002 | Miller ........................... 725/112 |
| 2003/0065719 A1 | 4/2003 | Ullman et al. |
| 2003/0122966 A1 | 7/2003 | Markman et al. |
| 2003/0154492 A1 * | 8/2003 | Falvo et al. ................... 725/113 |
| 2003/0159153 A1 * | 8/2003 | Falvo et al. ................... 725/110 |
| 2004/0005900 A1 | 1/2004 | Zilliacus |
| 2004/0055018 A1 | 3/2004 | Stone |
| 2004/0097246 A1 | 5/2004 | Welch |
| 2004/0139482 A1 * | 7/2004 | Hale et al. .................... 725/135 |
| 2004/0181817 A1 * | 9/2004 | Larner .......................... 725/143 |
| 2004/0205830 A1 * | 10/2004 | Kaneko ......................... 725/135 |
| 2004/0250297 A1 * | 12/2004 | Fuisz ............................ 725/135 |
| 2005/0108026 A1 | 5/2005 | Brierre et al. |
| 2005/0198678 A1 * | 9/2005 | Mise et al. ...................... 725/88 |
| 2008/0090513 A1 * | 4/2008 | Collins et al. ................. 455/3.01 |
| 2009/0067510 A1 * | 3/2009 | Hamilton ................. 375/240.26 |
| 2009/0307732 A1 * | 12/2009 | Cohen et al. .................... 725/87 |

FOREIGN PATENT DOCUMENTS

| | | |
|---|---|---|
| JP | 2003-316998 | 11/2003 |
| WO | WO 01/58151 A2 | 8/2001 |
| WO | WO 01/65743 | 9/2001 |
| WO | WO 2004/038982 | 5/2004 |
| WO | WO 2004/088983 A2 | 10/2004 |

OTHER PUBLICATIONS

Search Report Dated Oct. 25, 2007, PCT/US2006/031881.

* cited by examiner

METHOD AND APPARATUS FOR ELECTRONIC MESSAGE DELIVERY

This application claims the benefit under 35 U.S.C. §365 of International Application PCT/US2006/031881, filed Aug. 15, 2006, which was published in accordance with PCT article 21(2) on Feb. 22, 2007 in English and which claims the benefit under 35 U.S.C. §119 of a provisional application 60/708,623 filed in the United States on Aug. 16, 2005.

FIELD OF THE INVENTION

The present invention relates generally to electronic delivery of content to devices in an entertainment venue during the presentation of an event.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

The term "digital cinema" refers generally to the creation and/or distribution of motion pictures to cinemas in digital form, in contrast to traditional cinema whose content, including the image, sound track and subtitles, exists in an analog form on motion picture film. Digital cinema projection systems now exist and make use of a variety of technical solutions, rather than a single standardized solution embraced by all. The existence of content in digital form affords the opportunity to provide alternative information along with the original content with little effort. For that reason various organizations, such as the Digital Cinema Initiative ("DCI") and the Society for Motion Picture Engineering ("SMPTE") have devoted much effort towards establishing specifications for digital cinema content distribution.

The DCI specification defines preferred solutions in many areas, such as encoding, distribution, and security. The SMPTE has sought to refine the DCI specification from a technical and implementation perspective. The goal of these specifications is to provide an open architecture that promotes high level and uniform technical performance. The system can provide enhanced sound and image content while providing the theatre patron with a more consistent movie experience. The system also affords potential simplification of production and distribution, delivery, and storage of the movie content.

DCI also permits new business opportunities. The distribution of digital media creates the capability to deliver alternative programming. The delivery system may also permit new and improved advertising capabilities, all of which may enhance the profit capabilities of the businesses involved.

Targeted advertising is a relatively new opportunity that has mainly focused on such areas as electronic billboards and broadcasted cellular phone activities. Neither of these activities offers any real advantages in terms of activities during a presentation, such as a movie, at a venue. None of these forms of delivery take advantage of the mere fact that presence at a theatre or event provides a specific type of marketing opportunity. In addition, the actual movie presentation itself provides opportunities for promoting materials, and specifically promoting the material at an appropriate time within the movie or event presentation.

Further, the proliferation and penetration of usage of portable electronic consumer devices is steadily increasing. The ability to deliver electronic messages and content directly to these types of devices at a particular event or presentation is a powerful entertainment and marketing tool. Distribution of electronic messages to consumer devices in an entertainment venue is valuable particularly since the target audience is in the immediate area and has an interest in the content.

Currently, some ancillary information, such as addresses, phone numbers, websites, e-mail addresses may be presented using methods employing broadcast techniques. However, the delivery of this information is, in general, not specifically tied to the presentation of the event with respect to presentation timing or location, potentially limiting its overall effectiveness as an entertainment and marketing tool. Therefore, there is a need for providing content specific to the presentation of an event, such as a movie, while the presentation of the event is occurring.

SUMMARY OF THE INVENTION

The disclosed embodiments relate to the packaging, distributing, and delivery of content to devices in an entertainment venue during an event such as a Digital Cinema presentation. One embodiment is a method for delivering an electronic message including the steps of receiving a package containing first content and second content, separating the first content from the second content, providing the first content on a first medium, and providing an electronic message based on the second content on a second medium.

Another embodiment is a method for packaging electronic messages including the steps of receiving a digital cinema package containing a main presentation, identifying auxiliary media content associated with the main presentation, marking temporal locations within the main presentation to allow delivery of electronic messages based on auxiliary media content, and creating an augmented digital cinema package including the main presentation with the marked temporal locations.

Yet another embodiment describes a composition playlist including a main presentation file containing at least one of an audio or picture presentation file and an auxiliary content file containing temporal links associated with the main presentation, the auxiliary content file to be delivered as an electronic message at a predetermined time based on the temporal links during presentation of the main presentation file.

The characteristics and advantages of the present invention may become more apparent from the following description, given by way of example.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The following describes a system for delivering electronic messages associated with a movie presentation using digital cinema. Other systems utilized to deliver electronic messages related to other presentations where the input may be supplied by some other means may include very similar structures. Those of ordinary skill in the art will appreciate that the embodiment of the system and circuits described herein is merely one potential embodiment. As such, in alternate embodiments, the components of the system and circuits may be rearranged or omitted, or additional components may be added.

Figure 1:
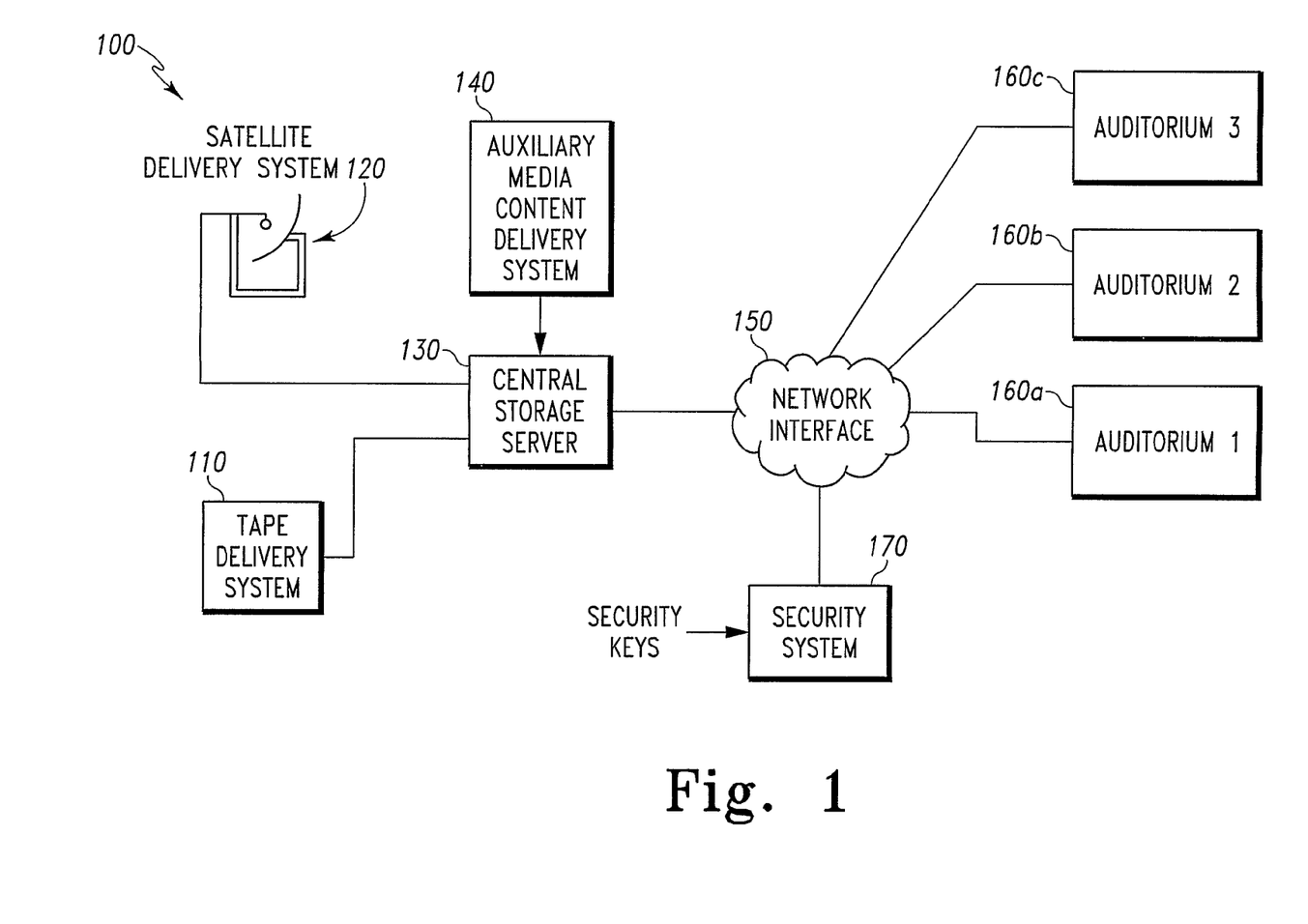
FIG. 1 is a block diagram of an exemplary digital cinema system using the present invention.

Turning now to the drawings and referring initially to FIG. 1, a block diagram of an exemplary digital cinema system using an embodiment of the present invention is shown. FIG. 1 illustrates a delivery system 100 used for delivering digital cinema content to cinemas. A digital cinema package (DCP) is provided to a central storage server 130. The DCP may be supplied to the central storage server 130 using a number of delivery systems including tape or disk, or a satellite, wireless, or wired interface. In a preferred embodiment, the DCP information is supplied to the central storage server 130 via a satellite delivery system 120, with a tape delivery system 110 used as a back-up. As discussed in further detail below, the DCP is a set of files that represent a digital cinema show. The DCP contains the essence files of the presentation, such as pictures, audio or sound, and subtitles. The DCP may include compressed and/or encrypted files as required. In addition, the DCP includes a composition playlist with packing information and playback instructions in the form of XML files. The composition playlist dictates how the different essence files are to be is played during the presentation.

The central storage server 130 also has an input for an auxiliary media content delivery system 140. The auxiliary media content is content that is not normally provided as part of the DCP. The auxiliary media content may include material such as websites, advertisements, and marketing materials related to some aspect of the content in the DCP. The auxiliary media content may be provided to the auxiliary media content delivery system 140 from various sources such as the film creator, a movie studio, or the internet in addition to the main delivery systems for DCPs. The auxiliary media content system 140 may collect the auxiliary media content from the various sources and provide the necessary content to the central storage server 130 as needed and/or requested by the central storage server 130. The auxiliary media content may be embedded into the DCP already or added to the DCP either before the DCP is stored or when the DCP is prepared for further delivery. The embedding process of the auxiliary media content into the DCP will be described further herein.

The central storage server 130 supplies an augmented DCP to one or more auditoriums 160a,b,c over a network using a network interface 150. In a preferred embodiment, the network interface 150 is an Ethernet hub. The auditoriums 160a,b,c may be located together within one building complex. Alternately, the auditoriums 160a,b,c may be located in different buildings and even located significant distances from each other. The arrangement of the auditoriums 160a,b,c may determine the type of network employed for delivery of the augmented DCP.

In order to prevent unauthorized reception of the augmented DCP from the central storage server 130, a security system 170 may be provided. The security keys may be generated in conjunction with or separately from the delivery system 100. In one embodiment, the security keys are provided by the DCP content provider based on valid authorization information for both the content and the auditorium using the content. Further, each of the keys may be associated with only one of the auditoriums 160a,b,c, preventing unauthorized delivery of content to any of the other auditoriums 160a,b,c.

The auditoriums 160a,b,c receive an augmented DCP based on requests made by equipment within the auditoriums 160a,b,c, not shown. Alternately, the auditoriums 160a,b,c may receive an augmented DCP based on a delivery schedule provided by either the central storage server 130 or by an additional auditorium content manager, not shown. The auditoriums 160a,b,c process the augmented DCP in order to produce the content for audio, pictures, and subtitle presentation to the patrons in attendance. The auditoriums 160a,b,c may also be able to transmit any auxiliary media content provided with the augmented DCP to the patrons. The delivery and reception of the auxiliary media content will be described below. The auditoriums 160a,b,c may also be capable of receiving additional auxiliary media content directly. The additional auxiliary media content provided directly to the auditoriums 160a,b,c may be used to add to or replace some or all of the auxiliary media content provided in the augmented DCP.

Figure 2:
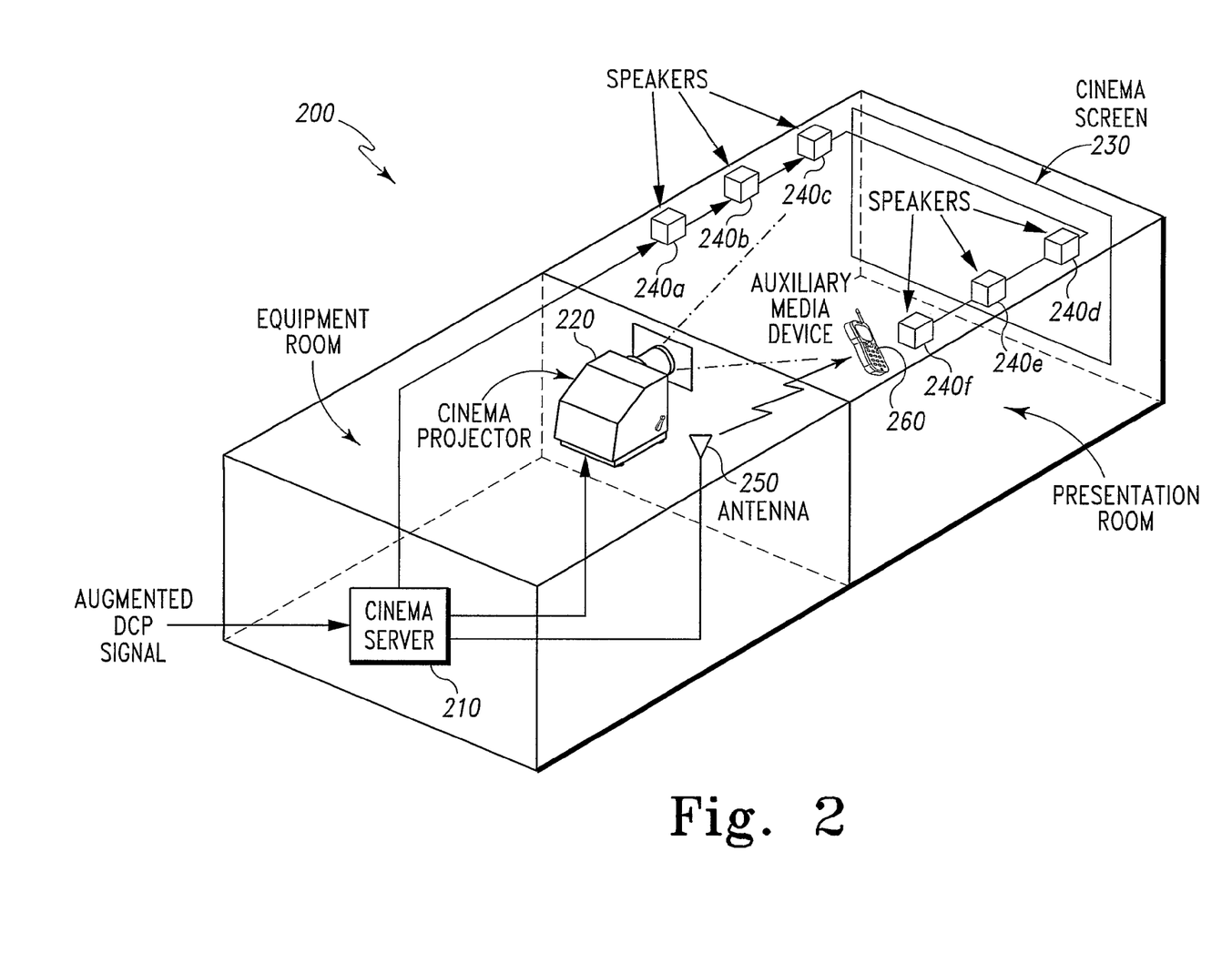
FIG. 2 is a diagram illustrating an exemplary cinema auditorium system using the present invention.

Turning now to FIG. 2, a block diagram of an exemplary auditorium system using an embodiment of the present invention is shown. FIG. 2 illustrates an auditorium 200 such as the auditoriums 160a,b,c shown previously in FIG. 1. Auditorium 200 is often divided into several rooms. In a preferred embodiment, auditorium 200 is divided into a presentation room and an equipment room. The presentation room is used by the patrons of the auditorium 200 during a presentation such as a movie. The equipment room is used by the operators of the auditorium 200 for housing most of the equipment necessary for the presentation, and additionally is usually not accessible by the patrons.

The augmented DCP signal is supplied from a network interface to a cinema server 210 located in the equipment room of auditorium 200. The cinema server 210 provides the signal processing necessary to separate the various elements of the augmented DCP stream into appropriate pictures, audio, and other signals for presentation. The cinema server 210 may also provide any video signal formatting necessary, such as converting the incoming picture file to a picture signal with the necessary format and aspect ratio for display in the presentation room of the auditorium 200. For instance, cinema server 210 may decode the picture files in a DCP using JPEG200 with 12 bits per pixel and color component and produce a digital bitstream in a required display format. The cinema server 210 may also process and convert the audio signal in order to separate and further generate the various audio elements as needed for the audio reproduction system employed. In some instances the audio file in a DCP may not be compressed. The audio file is often encoded using 24 bits per sample at 48K samples/second.

The cinema server 210 also separates and manages any auxiliary media content provided either through the augmented DCP stream, or supplied directly to the auditorium 200 as additional auxiliary media content. The cinema server 210 establishes any timing for delivery of the auxiliary media content by decoding synchronization information supplied within the DCP. Further details on timing and synchronization of auxiliary media content will be described below.

A picture content signal output from the cinema server 210 is supplied to a cinema projector 220. The cinema projector 220 receives the picture content signal and generates a light emitting picture output for display on a cinema screen 230 located in the presentation room of the auditorium 200. In a preferred embodiment, the cinema projector 220 receives a picture content signal in the form of a digital data stream representative of the luminance levels of the three colors red, green, and blue. Picture information pertaining to each of these colors is separated and provided to a digital light projection (DLP) circuit that uses a high intensity polarized light source in order to produce and project the video image through an opening in the wall adjoining the two rooms in the auditorium 200. The projected light source, representing the cinema presentation picture image, is projected to the other end of the presentation room of the auditorium 200 and displayed on the cinema screen 230.

An audio content signal from the cinema server 210 is supplied to speakers 240a-f located in the presentation room of auditorium 200. The speakers 240a-f may include additional signal processing such as audio equalization and/or amplification. The audio content signal may alternately use a centrally located processing system, not shown, for audio equalization and amplification. The central processing system may then provide the equalized and amplified signals to speakers 240a-f. The number and location of the speakers used in the presentation room may vary depending on requirements and design. In a preferred embodiment, six speakers 240a-f are located with three on each side wall of the presentation room of the auditorium 200. The speakers 240a-f are positioned equidistant spanning the length of a side and pointed perpendicular to the cinema screen 230.

An auxiliary media content signal from the cinema server 210 is supplied to antenna 250. The cinema server 210 may include any signal processing, including signal amplification, to put the auxiliary media content signal in a condition for transmission by antenna 250. Alternately, a separate amplifier, not shown, may process and amplify the auxiliary media content signal prior to transmission. The transmission method may involve the protocols associated with a wireless network system such as Wi-Fi. The transmission method may also involve use of cellular phone network communications. The transmission method may also involve a proprietary approach using either analog or digital communications techniques such as frequency modulation (FM) or quarternary phase shift keying (QPSK).

An electronic message, representing the auxiliary media content signal, is transmitted from antenna 250 and may be received by auxiliary media device 260. The auxiliary media device 260 receives the electronic message, decodes the message, and provides the message to the patron possessing the electronic media device 260. The electronic message may be provided to the patron in the form of subtitles, pictures and audio. The auxiliary media device 260 may be embodied as a wireless network or Wi-Fi terminal, a cellular phone, a pager, or a proprietary communications device.

The auxiliary media device 260 may include a display and some type of audio driver such as a speaker or a headphone connection. The auxiliary media device 260 may further include user controls for permitting a patron to control operation. For example, a wireless network terminal may include a keypad for entry of commands and/or a touch screen for responding to prompts. The prompts may be responses to questions related to the delivered electronic message such as continuing with further information, or going out onto the internet. The auxiliary media device 260 may also allow the user to silence or disable certain or all electronic messages.

The cinema server 210 and auxiliary media device 260 may also communicate with each other bi-directionally. Auxiliary media device 260 may additionally include a transmitter for transmitting information such as text, pictures and/or audio back to the cinema server 210. For example, responses may be transmitted from the auxiliary media device based on prompts in the delivered electronic messages. The responses may be answers to questions presented to a patron in an electronic message. Further, the patron, through the transmission capability from the auxiliary media device, may notify the cinema server 210 that no message receipt capability is desired. The cinema server 210 may additionally include a receiver circuit for receiving communications from one or more auxiliary devices 260 and include processing for determining and maintaining a roster of auxiliary media devices 260 that are active and in use in the auditorium 200. The cinema server 210, using an identifier signal for an auxiliary media device, could further target delivery of electronic messages only to patrons who desire to receive the messages or only to certain types of auxiliary media devices 260.

Although the embodiment describes the delivery electronic messages containing picture, audio, and other content related to a presentation, some performances may require only picture or audio content related to the presentation. For instance, in a musical play, the video content may be provided as a live presentation, and audio content, such as musical elements, provided via the system described. Similarly, a live music concert may only require the delivery of picture content via the system described. However, the delivery system may still use the delivery of auxiliary media content in the manner described herein.

Figure 3:
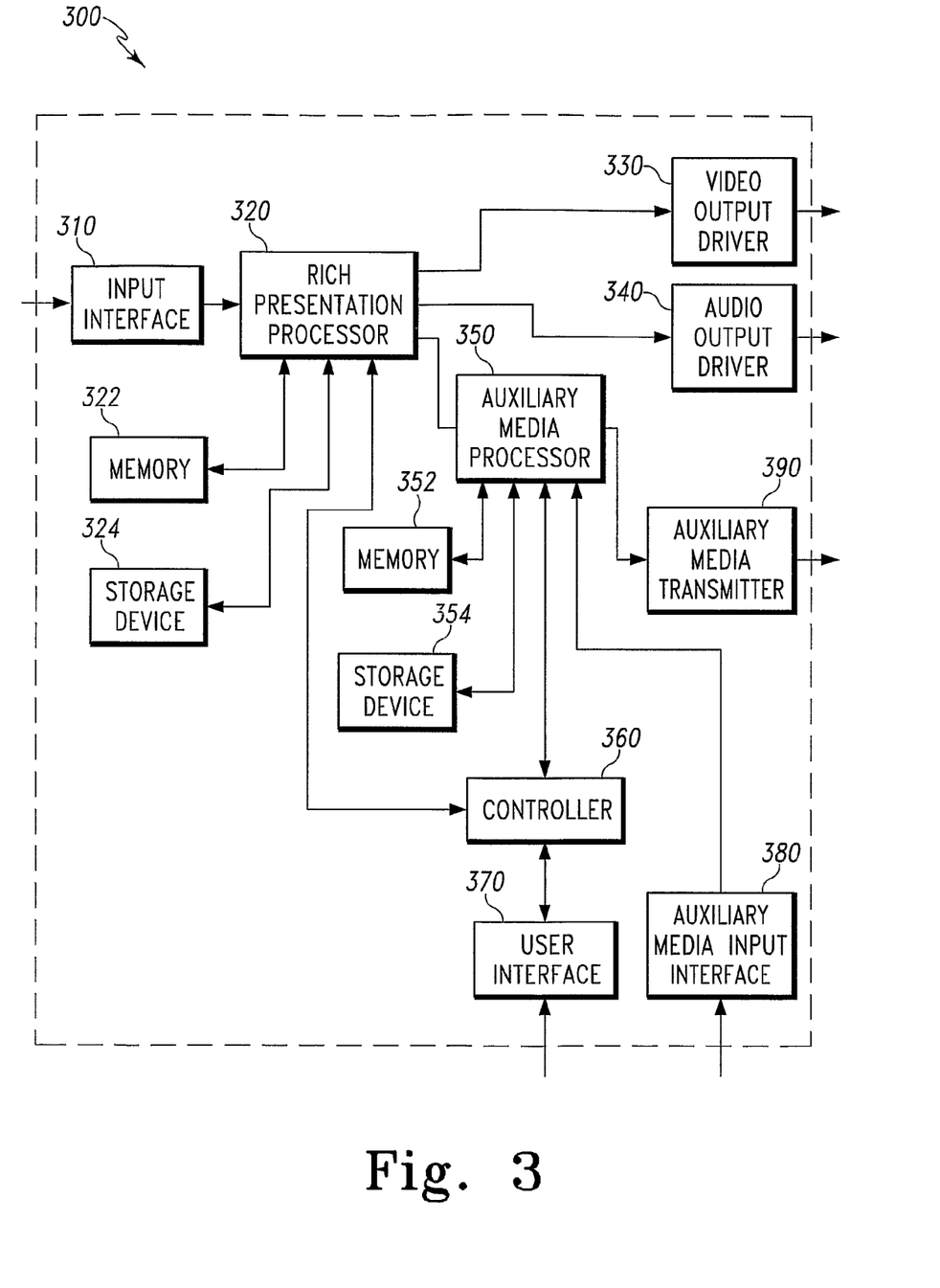
FIG. 3 is a block diagram illustrating an exemplary cinema server using the present invention.

Turning now to FIG. 3, a block diagram of an exemplary cinema server using the present invention is shown. FIG. 3 illustrates a cinema server 300 including the capability for processing a DCP along with processing auxiliary media content and delivering electronic messages. An input data stream, representing an augmented DCP, is input through the input interface 310. The input interface 310 provides the necessary signal conversion from the delivery format and signaling protocol to a data interface more readily processed within the cinema server 300. In a preferred embodiment, the input interface 310 may provide a conversion from an Ethernet signal format into a parallel eight bit bus signal format.

The converted data stream from the input interface 310 is provided to the rich presentation processor 320. The rich presentation processor 320 separates the converted data stream into sets of individual presentation content, such as pictures, audio, subtitles, and auxiliary media content. The rich presentation processor 320 also separates and decodes any code instructions, such as the composition playlist, supplied as part of the DCP. The rich presentation processor 320 operates on the incoming converted data stream following the code instructions provided within the DCP format. Further the rich presentation processor 320 may operate using instructions included internally. The rich presentation processor may also separate and decode any security information, and may perform such functions as key validation for valid receipt of the DCP. The rich presentation processor 320 may also provide initial signal processing for the individual presentation content.

The rich presentation processor 320 also processes content synchronization information for the presentation. The synchronization information may be supplied along with, or as part of, the instructions provided in the DCP. Synchronization of the content then proceeds based on instructions within the DCP structure as well as instructions within the rich presentation processor 320. Time base information required to perform the synchronization may also be supplied within the instruction provided in the DCP, or alternately may be generated by the rich presentation processor 320.

A memory 322 may be connected to the rich presentation processor 320. Memory 322 may primarily store portions of the incoming converted data stream as well as store portions of the presentation signals in order to facilitate content synchronization. Memory 322 may also be used to store control information and operating code for the rich presentation processor 320 as well as intermediate computational values for any processing. In a preferred embodiment, memory 322 is in the form of random access memory (RAM) and is used for all memory requirements. In another embodiment, memory 322 includes RAM for operations control of the rich presentation processor 320 as well as storage of portions of the data stream and presentation signal. A read only memory (ROM) may be used to store initialization and control software for the rich presentation processor 320.

Memory 322 may also store critical security information such as keys or algorithms. Portions of the security information may be stored in either RAM or ROM. It is also important to note that some other method of storing and retrieving security information may be used as is well known to those skilled in the art.

A storage device 324 may also be connected to the rich presentation processor 320. The storage device 324 has more storage capacity than the memory 322 and may also be capable of storage over a longer period of time. Storage device 324 may be used to store larger segments of the incoming converted data stream. Alternately, storage device 324 may store an entire augmented DCP, allowing the cinema server 300 to essentially download an augmented DCP in its entirety prior to processing the DCP using the rich presentation processor 320. In a preferred embodiment, storage device 324 is a hard disk drive.

The rich presentation processor 320 outputs several presentation signals, including the picture, and audio, and subtitle presentation signals as required for presentation.

The picture presentation output signal from the rich presentation processor 320 is provided to the picture output driver 330. The video output driver 330 provides final signal conversion of the picture presentation signal to a video content signal provided externally for operating the cinema projector. In a preferred embodiment, the picture presentation output signal is a digital picture signal and the picture output driver 330 converts the compressed digital picture signal to an uncompressed digital signal containing picture luminance information for the colors red, green, and blue as digital pixel values for delivery to the digital projector.

The audio presentation output signal from the rich presentation processor 320 is provided to the audio output driver 340. The audio output driver 340 provides final signal conversion of the audio presentation signal to an audio content signal provided externally for operating the speakers. In a preferred embodiment, the audio presentation output signal is a digital audio signal and the audio output driver 340 converts the audio presentation signal into six different analog audio signals provided externally, one signal for each speaker. In another embodiment, the audio presentation signal is processed by audio output driver 340 and is delivered as digital audio signals externally to the speakers. The audio output driver 340 may also provide audio frequency response equalization and signal amplification for each of the six different analog audio signals.

The auxiliary media presentation output signal from the rich presentation processor 320 is provided to the auxiliary media processor 350. The auxiliary media processor 350 provides any additional processing of the auxiliary media signal, if necessary. The auxiliary media processor 350 manages the auxiliary media presentation output signal and also manages the additional auxiliary media content which may be provided directly to the cinema server 300.

It should be noted that although the rich presentation processor 320 and auxiliary media processor 350 are shown as separate processors, the two processors may be combined and embodied in one single processor device in a manner as known to those skilled in art.

An auxiliary media input interface 380 is connected the auxiliary media processor 350. The auxiliary media input interface allows additional auxiliary media content to be input into the auxiliary media processor 350.

The auxiliary media signal is output from the auxiliary media processor 350 to the auxiliary media transmitter 390. The auxiliary media transmitter 390 may format the auxiliary media signal into a suitable transmission signal such as a QPSK signal. The auxiliary media transmitter 390 may also process the transmission signal to add elements such as error correction, as required by a particular transmission standard or as is well known to one skilled in the art.

A memory 352 may be connected to the auxiliary media processor 350. Memory 352 may primarily store portions of the incoming auxiliary media content or additional auxiliary media content to facilitate content synchronization. Memory 352 may also be used to store control information and operating code for the auxiliary media processor 350 as well as intermediate computational values for any processing. In a preferred embodiment, memory 352 is in the form of random access memory (RAM) and is used for all memory requirements. In another embodiment, memory 352 includes RAM for operations control of the auxiliary media processor 350 as well as storage of portions of auxiliary media content. A read only memory (ROM) is used to store initialization and control software for the auxiliary media processor 350.

A storage device 354 may also be connected to the auxiliary media processor 350. The storage device 354 has more storage capacity than the memory 352 and may also be capable of storage over a longer period of time. Storage device 354 may be used to store larger segments of auxiliary media content. Alternately, storage device 354 may store additional auxiliary media content provided to or generated by the cinema server. The storage device 354 allows the cinema server 300 to receive additional auxiliary media content in its entirety at period of time in advance of delivering the content as electronic messages in conjunction with a presentation. In a preferred embodiment, storage device 354 is a hard disk drive.

It should be noted that although the memory 322 and memory 352, and storage device 324 and storage device 354 are shown as separate memories and storage devices, the memories and/or storage devices may be combined and embodied in one device in a manner as known to those skilled in art. For instance, a single storage device such as a hard disk drive may be partitioned into two parts, one part representating storage device 324 and the other part representing storage device 354.

A controller 360 is connected to both the rich presentation processor 320 and auxiliary media processor 350. Controller 360 may manage the interaction between the two processors as well as execute or process instructions delivered with the DCP. Controller 360 may also manage the exchange of auxiliary media content within the auxiliary media processor 350. Controller 360 may also control the receiving portion of a two way communications system for delivering electronic messages. Controller 360 may maintain identifiers for devices capable of and/or receptive of delivery of electronic messages. Controller 360 may also be capable of processing return data such as answers to polling questions provided with the electronic messages.

A user interface 370 is connected to controller 360 and may allow interactive control information between a person operating or controlling the presentation and the cinema server 300. The user interface 370 may provide external connections for a control display monitor, touch screen system, mouse, and/or keyboard.

The cinema server 300 may also include a receiver, not shown, for receiving a signal provided from auxiliary media devices 260 as previously described. The receiver may utilize an architecture for receiving and demodulating the signal as required based on a particular transmission standard (e.g. Bluetooth) and as is well known to those skilled in the art. The receiver may provide a demodulated output signal to the controller 360 for processing as previously described.

Figure 4:
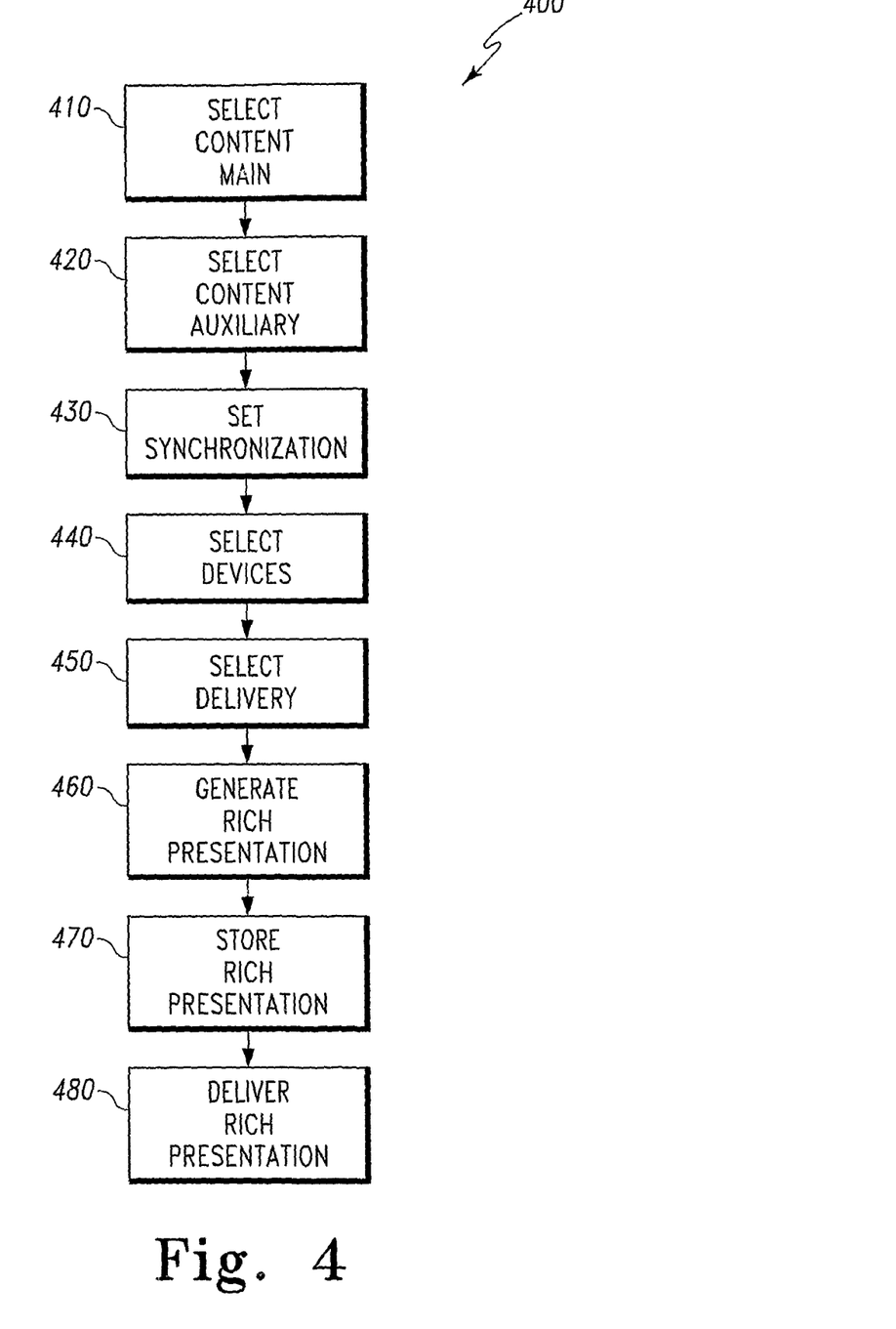
FIG. 4 is a flow chart illustrating an exemplary process for delivering digital cinema content using the present invention.

Turning now to FIG. 4 a flow chart illustrating an exemplary process for delivery of Digital Cinema using the present invention is shown. FIG. 4 describes a method for inserting the auxiliary media content into a DCP to create an augmented DCP containing the auxiliary media content. It should be noted that the process as described may occur at one or more of several points along the content generation and delivery process of events. For instance, the process as described, may be performed and controlled at a studio and implemented prior to delivery into the system shown in FIG. 1 Similarly, the process may be incorporated within the system shown in FIG. 1, allowing potentially more lower level or local control over the addition of auxiliary media content. Further, certain steps shown may be omitted depending on the location of where the insertion process is incorporated.

First, at step 410, main show content is selected for inclusion in a rich presentation. A rich presentation will eventually encompass all the content necessary for delivery and use in a facility such as an auditorium. The main show content may be selected from storage of various elements of content media for use in the main show presentation, such as the video content audio soundtracks and subtitle tracks for a movie. Additional soundtracks for auxiliary sound may also be selected and included. The main show content may also comprise a DCP having already been packaged. As content is selected, links to the content are identified, generated, and/or maintained in a program of instructions that will allow the final collection to be unpackaged and presented.

Next, at 420, auxiliary media content may be selected from storage of auxiliary media. The auxiliary media content may include, but is not limited to, text, games music, video clips, or still images. The auxiliary media content may also include website links, coupons, fast facts or factoids pertinent to the main presentation. Further, the auxiliary media content may also include details on apparel or merchandise, other activities and future events related to the presentation, or other advertisements. Also, the auxiliary media content may contain a special username and/or password or passcode to permit private access to a special website related to the presentation. As content is selected, links to the content are identified, generated, and/or maintained in a program of instructions that will allow the final collection to be unpackaged and presented.

Next, at step 430 the content is assembled and synchronization information is established. The assembly and synchronization operation can be performed manually by an operator or automatically based on the result of the Digital Cinema mastering process. Even if auxiliary media content has not been selected and/or included, synchronization links may be added to the program instructions provided with the final package. The links will allow auxiliary media content to be properly and timely inserted at some later point within the overall delivery process. The links may also serve as temporal cues for delivery of auxiliary media content during the presentation at a local level, such as for content generated or delivered directly to a presentation facility.

Next, at step 440, the type of presentation device(s) the final presentation may be displayed on is selected. This information may be included in the program instructions as part of the DCP, or as additional program information. Presentation device types may be selected for both the main and auxiliary presentation. For example, some auxiliary media content may only be delivered to cell phones with Bluetooth capabilities.

Next, at step 450, a storage and delivery method is selected. Any formatting information for either storage or delivery is generated as needed for final generation of the presentation. Additionally, information about the delivery method may be added to the program instructions provided with the final generation of the presentation. As mentioned previously, depending on the location within the delivery chain, the delivery method may be selected as a tape or satellite delivery, or may be selected as delivery over a network, such as Ethernet.

Next, at step 460, all of the content selected and included is processed to generate a rich presentation. The form of the rich presentation is a DCP or an augmented DCP that is generated based on the program and delivery instructions mentioned above. Additionally, the program information generated in the previous steps is now combined in with the selected content and formatted for the appropriate storage and/or delivery method. The rich presentation is then stored, at step 470, using an appropriate storage medium, such as a tape, digital video disk, or hard drive. Last, at step 480, the rich presentation, formatted as a DCP, an augmented DCP, or some other format is delivered. As described previously, the delivery methods may vary, and may include delivery by courier in the case of a tape, by satellite transmission, or over a local network.

In one embodiment, the integration of auxiliary media content with main presentation content is based on XML (eXtensible Markup Language), a standardized, clear-text computer code. XML is a standardized language intended for use in publishing content on the Internet, but is being used to define data in other areas. In digital cinema for instance, XML is the common language in a composition playlist for describing content, the method to play the content, sub-titles, and associated metadata.

An example of what code incorporating auxiliary media content into a composition playlist might look like is:

```
<CompositionPlaylist xmlns:as="http://www.smpte-ra.org/dc28/.../aux-sound#"
                     xmlns:am="http://www.smpte-ra.org/dc28/.../aux-media#"...>
...
        <ContentTitleText>The Matrix IIIV</ContentTitleText>
    <ContentKind>Feature</ContentKind>...
...
    <ReelList>
        <Reel>
            <Id>urn:uuid:00000000-0000-0000-0000-000000000000</Id>
            <AssetList>
                <MainPicture> <Id>urn:uuid...</Id> <EditRate>24 1</EditRate> ... </MainPicture>
                <MainSound> <Id>urn:uuid...</Id> <EditRate>24 1</EditRate> ... <Language>en-us</Language>
</MainSound>
                <MainSubtitle> <Id>urn:uuid...</Id> <EditRate>24 1</EditRate> ... <Language>fr</Language>
</MainSubtitle>
                <as:AuxiliarySound>
                    <Id>urn:uuid...</Id> <AnnotationText> Foreign language soundtrack in Spanish </AnnotationText>
                    <EditRate>24 1</EditRate> ... <Language>es</Language> <TrackId>urn:fsound</TrackId>
                </as:AuxiliarySound>
            </AssetList>
        </Reel>
        <Reel>
            <Id>urn:uuid:00000000-0000-0000-0000-000000000001</Id>
            <AssetList>
                <MainPicture> <Id>urn:uuid...</Id> <EditRate>24 1</EditRate> ... </MainPicture>
                <MainSound> <Id>urn:uuid...</Id> <EditRate>24 1</EditRate> ... <Language>en-us</Language>
</MainSound>
                <MainSubtitle> <Id>urn:uuid...</Id> <EditRate>24 1</EditRate> ... <Language>fr</Language>
</MainSubtitle>
                <as:AuxiliarySound>
                    <Id>urn:uuid...</Id> <AnnotationText> Foreign language soundtrack in Spanish </AnnotationText>
                    <EditRate>24 1</EditRate> ... <Language>es</Language><TrackId>urn:fsound</TrackId>
                </as:AuxiliarySound>
                <am:AuxiliaryMedia>
                    <Id>urn:uuid:00000000-0000-0000-0000-000000000000</Id>
                    <AnnotationText>Download songs for the movie online</AnnotationText>
                    <EditRate>24 1</EditRate>
                    <IntrinsicDuration>3600</IntrinsicDuration>
                    <Content>
                        <Value>ftp://user:password@some.movie.com/</Value>
                        <Offset>0</Offset>
                    </Content>
                </am:AuxiliaryMedia>
            </AssetList>
        </Reel>
    </ReelList>
...
</CompositionPlaylist>
```

The example shows the way the main sound, picture, and sub-titles are composed in two reels for the digital projection of a movie. The Digital Cinema Package's Composition PlayList is the standard used for expressing the media synchronization. In addition, the example above includes auxiliary sound (foreign soundtrack) and auxiliary media content. The auxiliary media content is in the form of a uniform resource locator (URL) for downloading songs from the movies. The URL is shown for delivery at the beginning of the second reel. Although this example places the delivery of the electronic message at the start of the second reel, the temporal position within the presentation for the delivery of the electronic messages may be established anywhere within the presentation timeframe using codes within the composition playlist.

Figure 5:
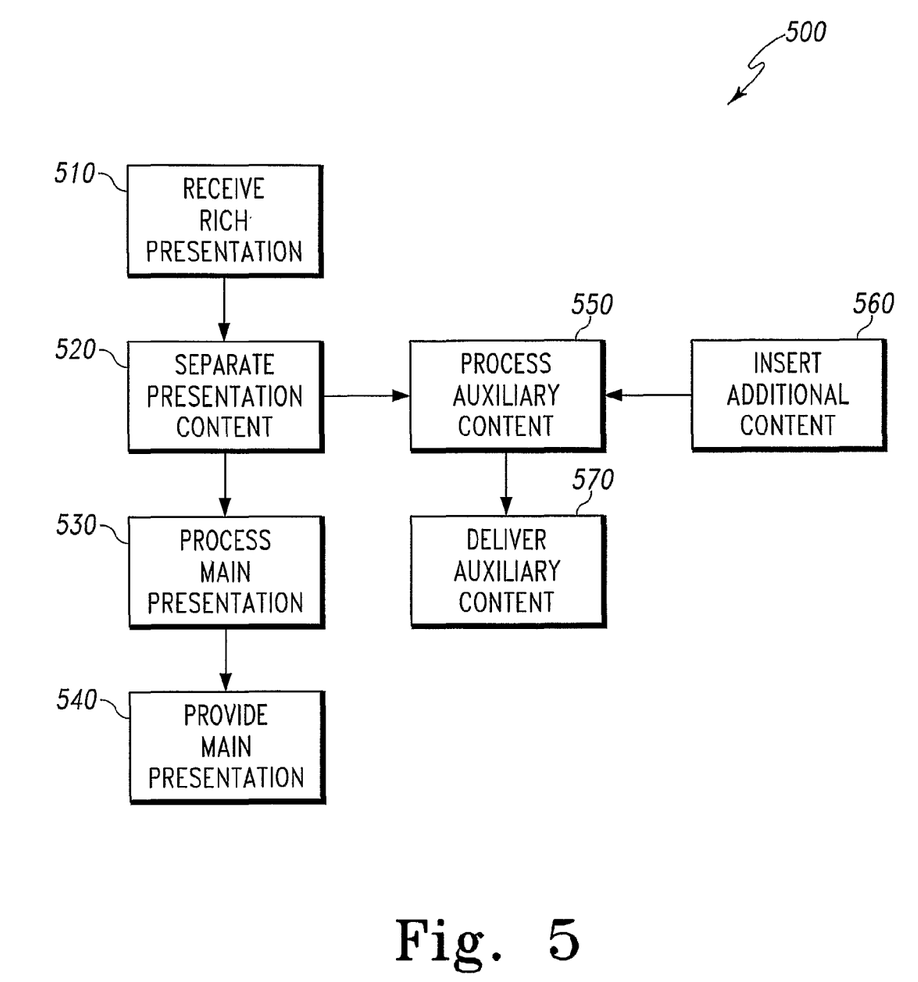
FIG. 5 is a flow chart illustrating an exemplary process for receiving digital cinema content using the present invention.

Turning now to FIG. 5 another flow chart illustrating an exemplary process for receipt of Digital Cinema content using the present invention is shown. FIG. 5 describes a method for delivering the auxiliary media content in conjunction with a presentation. First, at step 510, a rich presentation such as a DCP or augmented DCP is received. The rich presentation may be delivered using a number of delivery methods as described previously. The rich presentation may be received either by the central storage server as shown in FIG. 1 or by the cinema server as shown in FIG. 2 depending on the delivery method and location of processing equipment.

After the rich presentation is received, at step 520, the rich presentation is separated and processed to generate separate presentation signals. The separation and processing may be performed by a device such as cinema server 300. The separation step may also include selection of which main or auxiliary content will be presented, and/or insertion of the additional auxiliary media content.

Following the separation, at step 530, content associated with the main presentation is further processed. The further processing may also be performed by a device such as cinema server 300 or by other equipment at the presentation facility. The further processing may include any formatting of the subtitle, audio and/or picture content associated with proper presentation within a facility. Following processing, at step 540, the main show presentation is provided in the facility such as an auditorium.

Also, after separation, at step 550, the auxiliary media content is processed. In addition, at step 560, any additional auxiliary media content may be added in at step 550. The additional auxiliary media content may be used to add to any auxiliary media content originally provided in the rich presentation, or may be used to replace some or all of the auxiliary media content originally provided.

After processing the auxiliary media content, at step 570, the auxiliary media content is delivered to patrons of the facility during the presentation. The delivery may be limited to devices of some specific type (e.g., cell phones) or with specific capabilities (e.g., Bluetooth interface) as described previously. In addition, the delivery may be restricted to those patrons that requested the delivery of auxiliary media content based on bi-directional communications as described previously.

Although the present invention as described involves an application in an auditorium such as a movie theater, embodiments of the invention may also be applied to other applications involving presentation of material. For instance, the application may allow delivery of auxiliary content at professional sport venues, concerts, or live theaters. Further, events such as parades and conventions may take advantage of the invention. Any of these potential applications may use the invention to provide information of future event dates, event participants, or critical access information regarding locations of activities.

While the invention may be susceptible to various modifications and alternative forms, specific embodiments have been shown by way of example in the drawings and are described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method for delivering an electronic message to an audience at an entertainment venue, the method comprising the steps of:
   receiving a package containing first content for all users and associated second content for a subset of users, the package also containing an instruction file for instructing how the first content and second content are to be played;
   separating said first content from said second content based on the instruction file;
   providing said first content on a first medium;
   generating said electronic message based on said second content, the step of generating further including inserting any additional auxiliary media content provided directly at the entertainment venue; and
   providing said electronic message based on said second content on a second medium to the subset of users based on a roster of devices in use for receiving the message such that said electronic message is synchronized with a portion of said provided first content based on the instruction file.

2. The method set forth in claim 1, wherein said first content is primary content for a presentation and said second content is auxiliary media content.

3. The method set forth in claim 2 wherein said auxiliary media content contains a link to a website.

4. The method set forth in claim 1, wherein said first medium is film projection.

5. The method set forth in claim 1, wherein the second medium is wireless transmission.

6. The method set forth in claim 1, further comprising the step of receiving a response related to delivery of said electronic message.

7. The method set forth in claim 6, wherein said response comprises a request to disable delivery of said electronic message.

8. The method set forth in claim 1, wherein the step of generating further comprises the step of positioning said second content within specific temporal locations of said first content.

9. A composition playlist that dictates how essence files are to be played on a server during a presentation to an audience at an entertainment venue comprising:
   a main presentation file containing at least one of an audio or picture presentation file to be produced by a processor of said server and delivered on a first medium to all users, said main presentation file being stored in a memory of said server;
   an auxiliary content file, stored on said memory, containing temporal links associated with said main presentation file, said auxiliary content file to be delivered by said processor on a second medium as an electronic message at a predetermined time to a subset of users based on a roster of devices in use for receiving the electronic message based on said temporal links during presentation of said main presentation file on said first medium, said first medium being different than said second medium; and
   an instruction file containing instructions pertaining to how the main presentation file and auxiliary content file are to be played, the instructions further pertaining to inserting any additional auxiliary media content provided directly at the entertainment venue.

10. The composition playlist of claim 9, wherein said main presentation file is a movie.

11. The composition playlist of claim 9, wherein said auxiliary content file includes content associated with said main presentation file.

12. The composition playlist of claim 9, wherein said auxiliary content file contains a link to a website.

13. The composition playlist of claim 9, wherein said auxiliary content file is modified at a presentation facility.

14. A method for packaging electronic messages comprising the steps of:
   receiving a digital cinema package containing a main presentation, auxiliary media content, and an instruction file configured to instruct how the main presentation and auxiliary media content are to be played at an entertainment venue, the instruction file further configured to instruct how to insert any additional auxiliary media content provided directly at the entertainment venue;
   identifying said auxiliary media content associated with said main presentation;
   marking temporal locations within said main presentation to allow delivery of electronic messages based on said auxiliary media content;
   selecting a presentation device type for the main presentation and the auxiliary media content, the presentation device type for the main presentation being different than presentation device type for the auxiliary media content; and
   creating an augmented digital cinema package including said main presentation with said marked temporal locations and said selected presentation device type for the main presentation and the auxiliary media content.

15. The method of claim 14 further comprising the step of inserting auxiliary media content into said digital cinema package.

16. The method of claim 14, wherein said auxiliary media content includes a link to a website.

17. The method of claim 14, wherein said temporal locations are included in a composition playlist.

18. A presentation apparatus for delivering an electronic message to an audience at an entertainment venue, the apparatus comprising:
- means for receiving a package containing first content for all users and second content for a subset of users, the package also containing an instruction file for instructing how the first content and second content are to be played;
- means for separating said first content from said second content based on the instruction file;
- means for providing said first content in a presentation on a first medium;
- means for generating said electronic message based on said second content, the means for generating further including means for inserting any additional auxiliary media content provided directly at the entertainment venue; and
- means for transmitting said second content on a second medium to the subset of users based on a roster of devices in use for receiving the message in conjunction with said presentation such that said transmitting of said second content is synchronized to a portion of said first content in said presentation based on the instruction file.

* * * * *